United States Patent [19]

Ichikawa et al.

[11] Patent Number: 5,501,510
[45] Date of Patent: Mar. 26, 1996

[54] STRUCTURE FOR CONNECTING FLEXIBLE ANNULAR MOLDING TO WHEEL CAP BODY

[75] Inventors: Takashi Ichikawa; Isao Sumi, both of Aichi, Japan

[73] Assignee: Kabushiki Kaisha Tokai Rika Denki Seisakusho, Aichi, Japan

[21] Appl. No.: 467,293

[22] Filed: Jun. 6, 1995

[30] Foreign Application Priority Data

Jul. 28, 1994 [JP] Japan .................................. 6-176536

[51] Int. Cl.$^6$ ....................................................... B60B 7/04
[52] U.S. Cl. ........................... 301/37.23; 301/37.1
[58] Field of Search ................................ 301/37.1, 37.22, 301/37.23, 37.42, 37.36

[56] References Cited

U.S. PATENT DOCUMENTS

| | | | |
|---|---|---|---|
| 2,963,319 | 12/1960 | Barnes | 301/37.23 X |
| 3,036,866 | 5/1962 | Barnes | 301/37.23 |
| 3,183,039 | 5/1965 | Aske, Jr. | 301/37.23 |
| 5,372,406 | 12/1994 | Ohtsuka et al. | 301/37.23 |

FOREIGN PATENT DOCUMENTS 62-90201  6/1987  Japan .

Primary Examiner—Russell D. Stormer
Attorney, Agent, or Firm—Birch, Stewart, Kolasch & Birch

[57] ABSTRACT

An attaching structure of a wheel cap for attaching a flexible annular molding to a wheel cap body of a car, by which the former is easily and surely attached to the latter. An engaging leg of the flexible annular molding includes a proximal portion, a first engaging part, a second engaging part, and a distal end part. The first and second engaging part includes a first and a second projecting part, respectively. These first and second engaging parts project in a direction generally perpendicular to a direction in which the engaging leg extends, and project in different directions. The annular molding includes a first concave part between a molding body and the first projecting part; and a second concave part between the molding body and the second projecting part. Meanwhile, the wheel cap body includes a through-hole whose inner length corresponding to both the axial direction and the first concave part is approximately equal to a length in the axial direction of the first concave part, and whose inner length corresponding to both the axial direction and the second concave part is approximately equal to a length in the axial direction of the second concave part.

10 Claims, 8 Drawing Sheets 5,501,510

STRUCTURE FOR CONNECTING FLEXIBLE ANNULAR MOLDING TO WHEEL CAP BODY

BACKGROUND OF THE INVENTION

1. Field of the Invention

The present invention generally relates to a wheel cap provided with a flexible annular molding around a wheel cap body, and particularly relates to a structure for connecting the flexible annular molding to the wheel cap body.

2. Description of the Related Arts

Conventionally, there has been proposed a wheel cap, provided with a flexible annular molding around a wheel cap body for an automobile, which is so designed that the wheel cap is prevented from falling off the wheel of a tire of the automobile if an outer surface of the tire swells or deforms to push the wheel cap outwardly when the tire rides over a curbstone, for example, during driving the car.

The wheel cap has the body whose outer diameter is generally equal to the inner diameter of the tire, and the flexible annular molding which is connected around the periphery of the wheel cap body. According to this structure, it is because the swelling of the outer surface of the tire, under such a situation mentioned above, is absorbed by the elastic deformation of the flexible annular molding that the wheel cap is prevented from falling off the wheel.

The structure for connecting the flexible annular molding to the wheel cap body is shown in FIG. 8. The figure illustrates a situation in which the flexible annular molding 2 is connected around the peripheral edge portion of the disk-shaped wheel cap body 1. The wheel cap body 1 has a plurality of through-holes 1a around the edge portion thereof, although they are not shown in the figure.

The flexible annular molding 2 has a flexible annular molding body 3, and a plurality of engaging legs 4 projecting from the inner surface of the annular body 3. These engaging legs 4 are provided on the inner surface thereof at positions corresponding to those of the through-holes 1a made around the peripheral edge portion of the wheel cap body 1, so that each engaging leg 4 of the flexible annular molding 2 is engaged with each through-hole 1a of the wheel cap boy 1 at time of overlapping the radially inner peripheral edge portion of the molding body 3 onto the radially outer peripheral edge portion of the wheel cap body 1.

Each engaging leg 4 has a proximal part 4a which is engaged with the through-hole 1a of the wheel cap body 1; an intermediate flanging part 4b whose diameter is larger than the diameter of the through-hole 1a; and a distal portion 4c whose diameter is smaller than the diameter of the through-hole 1a.

The flexible annular molding 2 is connected around the peripheral edge portion of the wheel cap body 1 as follows: that is, firstly, the flexible annular molding body 3 is overlapped onto the peripheral edge portion of the wheel cap body 1 so that each engaging leg 4 of the flexible molding body 3 is inserted into each corresponding through-hole 1a of the wheel cap body 1, as shown in FIG. 9. After the insertion of the distal part 4c of each leg 4 into the through-hole 1a is accomplished, the distal part 4c thereof is pulled out of the through-hole 1a of the wheel cap body 1 inward by means of, for example, a nipper, until the intermediate flanging part 4b of the engaging portion 4 completely comes out of the through-hole 1a thereof. At this moment, the intermediate flanging part 4b is restored to its original shape to be engaged with the inner surface of the wheel cap body 1, thus the work to connect the flexible annular molding 2 to the wheel cap body 1 being completed, as shown in FIG. 8.

As mentioned above, although the diameter of the intermediate flanging part 4b of the engaging leg 4 is larger than the diameter of the through-hole 1a of the wheel cap body 1, the intermediate part 4b of the engaging leg 4 can be passed inside the through-hole 1a as shown in FIG. 9, because the intermediate flanging part 4b of the engaging leg 4 has its own flexibility by which it can be deformed.

The greater the ratio of the outer diameter of the intermediate flanging part 4b to the inner diameter of the through-hole 1a of the wheel cap body 1, the more desirable, because, with this structure, the strength for keeping the flexible annular molding 2 being connected to the wheel cap body 1 gets larger. The work to connect the flexible annular molding 2 to the wheel cap body 1 is, however, harder to carry out, if the ratio of one to the other is greater, because the intermediate flanging part 4b must be more forcibly passed through the through-hole 1a of the wheel cap body 1 with the flanging part 4b being compressedly flexed against the inner surface of the through-hole 1a thereof, as shown in FIG. 9.

In order to solve this problem, another type of a flexible annular molding 2 used with the wheel cap body 1 has been proposed. This type of the flexible annular molding 2 is illustrated in FIG. 10. As shown in the figure, the intermediate flanging part 4b of the engaging leg 4 is modified in such a way that a large part thereof, more specifically, a large part of the radially inward portion thereof, is omitted or cut away in order to make the diameter of the intermediate flanging part 4b smaller for the purpose of making the work to insert the intermediate flanging part 4b into the through-hole 1a easier.

With this construction, however, it goes without saying that the flexible molding 2 is more liable to drop off the wheel cap body 1 during driving the car, because of a shortage of strength for keeping the engaging leg 4 of the flexible annular molding 2 being connected to the wheel cap body 1.

SUMMARY OF THE INVENTION

Accordingly, it is an object of the present invention to provide a wheel cap, for an automobile, with a structure to make the work to connect the flexible annular molding to the wheel cap body easier and to give a sufficient resistance against an external force to be exerted upon the flexible annular molding in such a direction that it falls off the wheel cap body.

In accomplishing this and other objects of the present invention, there is provided a wheel cap for an automobile comprising: a wheel cap body which is formed approximately in a disk shape and which has a periphery thereof in which a plurality of through-holes are made with adjacent through-holes separating from each other with a predetermined space, and a flexible annular molding which is fitted around the periphery of the wheel cap body and which has a molding body and a plurality of engaging legs, corresponding to the through-holes, which extend from the molding body in a projecting direction in which each of the engaging leg is inserted into the through-hole of the wheel cap body, each engaging leg of the flexible annular molding having a proximal part, a first engaging part, a second engaging part, and a distal part, which are fixed one after another in this order from a side of the molding body, wherein the proximal part, which has an outer diameter generally equal to an inner diameter of the through-hole of the wheel cap body, engages the through-hole of the wheel cap body, wherein the first and second engaging parts have an outer diameter larger than the inner diameter of the through-hole, respectively, wherein the distal part has an outer diameter generally equal to or smaller than the inner diameter of the through-hole, the first engaging part having a first projecting part while the second engaging part having a second projecting part, wherein each of the first and second projecting parts extends in a direction generally perpendicular to the projecting direction of the engaging leg and extends in a direction different from each other with respect to the projecting direction, so that the first projecting part is provided at a location different from a location in which the second projecting part is provided with respect to a distance from the molding body, so that the flexible annular molding has a first concave part between the molding body and the first projecting part while the flexible annular molding has a second concave part between the molding body and the second projecting part, a length in the projecting direction of the through-hole which corresponds to the first concave part corresponding to a length in the projecting direction of the first concave part while a length in the projecting direction of the through-hole which corresponds to the second concave part corresponding to a length in the projecting direction of the second concave part.

The flexible annular molding is connected to the wheel cap body as follows.

First, the distal part of the engaging leg of the flexible annular molding is inserted into the through-hole of the wheel cap body.

Then, an external force is given to the flexible annular molding relative to the wheel cap body so that the second engaging part of the engaging leg is inserted into the through-hole with the second projecting part thereof being deformed flexibly against the through-hole of the wheel cap body.

Then, a further external force is given to the flexible annular molding relative thereto so that the first engaging part of the engaging leg is subsequently inserted into the through-hole with the first projecting part thereof being deformed flexibly against the through-hole thereof.

Then, when the first and second projecting parts of the engaging leg are passed through the through-hole thereof, both of the projecting parts are restored to their original shapes, by which the wheel cap body is held between the molding body and the first projecting part of the engaging leg, and between the molding body and the second projecting part thereof.

According to this structure, because only one of the first and second projecting parts of the engaging leg exists in a plane generally parallel to the wheel cap body, and because the width or diameter in the same plane of each of the projecting parts is smaller than the width or diameter of the corresponding projecting part of the first prior art, a smaller force suffices for inserting the engaging leg into the through-hole of the wheel cap body; in other words, it is easy to connect the flexible annular molding to the wheel cap body.

In addition, according to this structure, even if an external force is exerted upon the flexible annular molding relative to the wheel cap body in such a direction that the flexible annular molding falls off the wheel cap body, the falling-off of the flexible annular molding from the wheel cap body is effectively prevented, because the first and second projecting parts of the engaging leg are pressed against the wheel cap body to generate a sufficient resistance against the external force.

Preferably, the first engaging part has a first curving surface on a side of the distal part of the engaging leg while the second engaging part has a second curving surface on the side thereof, both surfaces mutually tapering into the distal part of the engaging leg.

With this structure, the insertion of the engaging leg of the flexible annular molding into the through-hole of the wheel cap body gets smoother.

Preferably, a part of the through-hole on an outer side of the wheel cap body is defined by a tapering surface, the tapering surface being so formed that an inner diameter of the tapering surface is reduced from the outer side to an inner side thereof.

With this structure, the above-mentioned insertion thereof is carried out more smoothly.

Preferably, the first and second projecting parts have a surface generally flat on a side of the molding body, respectively.

With this structure, if a force is exerted upon the flexible annular molding with respect to the wheel cap body in such a direction that the former drops off the latter, the escape of the first projecting part and/or the second projecting part of the engaging leg from the through-hole of the wheel cap body is surely prevented, because the sliding of each of the first and second projecting parts on a part of the wheel cap body against which each projecting part is pressed is surely prevented.

In the above structure, both the first and second projecting parts may extend in a radial direction of the wheel cap body.

Preferably, the second engaging part and the distal part are so made that the distal part on a side of the second projecting part of the engaging leg is formed generally level with a shoulder of the second projecting part thereof with respect to the projecting direction of the engaging leg.

With this structure, when an external force is exerted, for example, by pulling the distal part of the engaging leg, upon the flexible annular molding relative to the wheel cap body in order to connect the flexible annular molding to the wheel cap body, the engaging leg thereof is deformed flexibly into a shape closer to a straight line. Therefore, such an external force required to connect the flexible annular molding to the wheel cap body is reduced in amount effectively; in other words, the work to connect them to each other is carried out more easily.

BRIEF DESCRIPTION OF THE DRAWINGS

This and other objects and features of the present invention will become clear from the following description taken in conjunction with preferred embodiments thereof with reference to the accompanying drawings, in which.

DETAILED DESCRIPTION OF THE INVENTION

Figure 1:
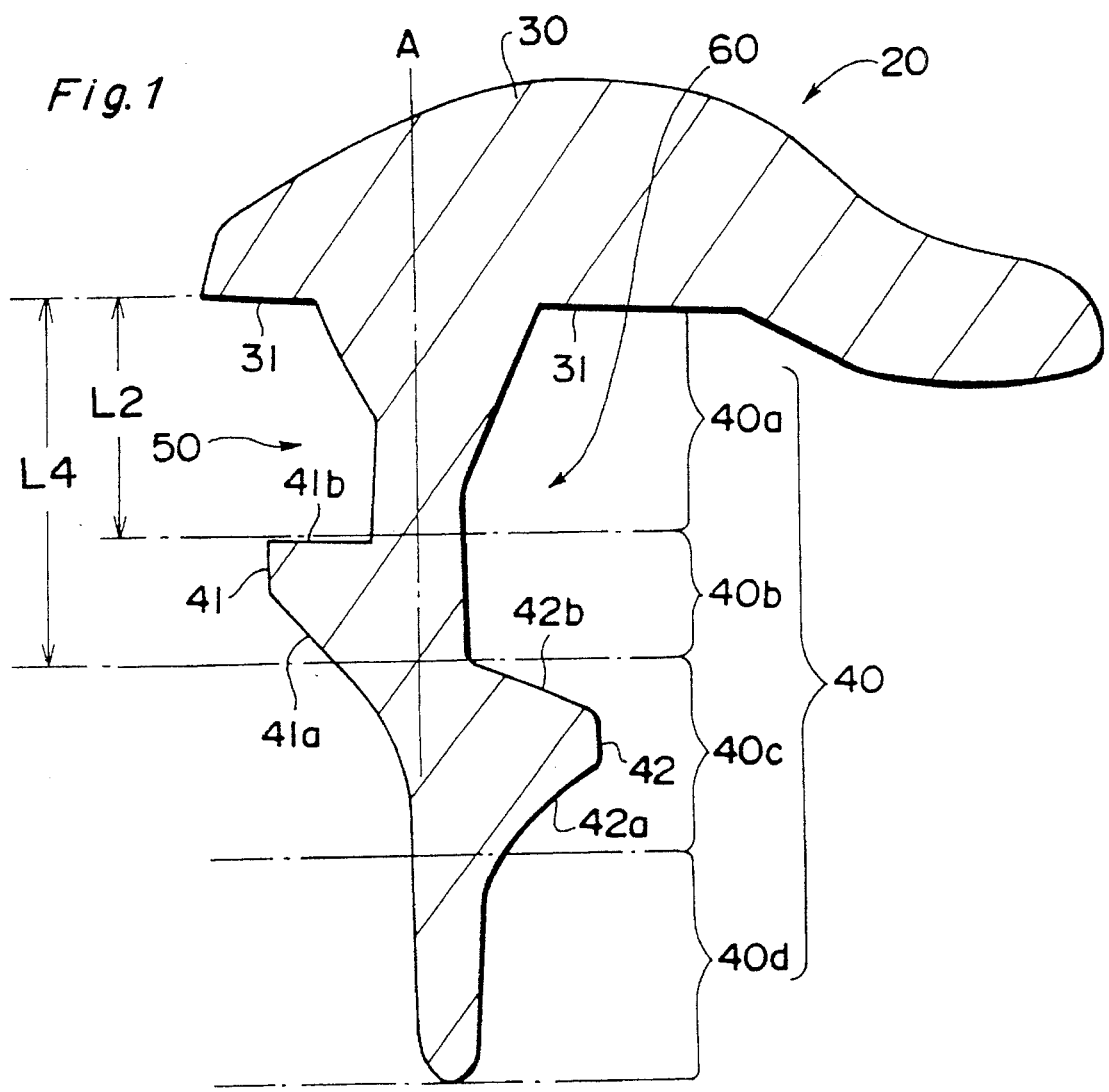
FIG. 1 is a partial, sectional view showing a wheel cap according to a first embodiment of the present invention.
Figure 1:
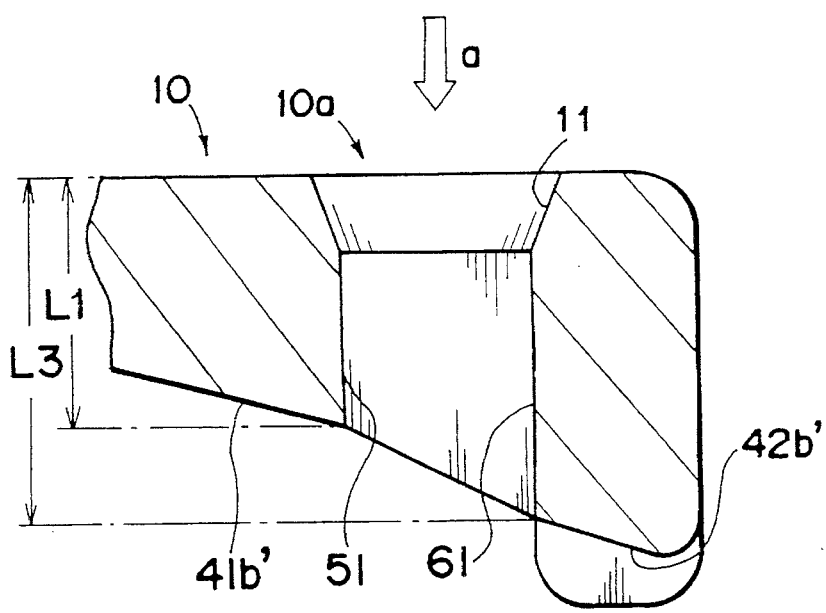

Before the description of the present invention proceeds, it is to be noted that like or corresponding parts are designated by like reference numerals throughout the accompanying drawings.

Referring to FIGS. 1 to 7, a detailed description is made upon a wheel cap according to a first and second preferred embodiment of the present invention.

First, referring to FIGS. 1 to 6, the wheel cap according to the first embodiment thereof is described below.

FIG. 1 illustrates both a partial section of a wheel cap body 10 and a partial section of a flexible annular molding 20 which is to be connected to the wheel cap body 10. As shown in the figure, the flexible annular molding 20 comprises a flexible annular molding body 30 generally in a flat shape, and a plurality of, for example, twenty, engaging legs 40, integrated with the flexible molding body 30, which project from an inner surface of the flexible annular molding body 30 with the engaging legs 40 being formed around a radially inward edge portion of the flexible molding body 30. The engaging legs 40 are formed around the radially inward edge portion thereof with a predetermined space between adjacent legs 40. The wheel cap body 10 comprises a plurality of, for example, twenty, through-holes 10a, in case that the number of the engaging legs is twenty as mentioned above, made around a radially outward edge portion thereof with the same space as that between the adjacent legs 40 of the flexible annular molding, between the adjacent through-holes. The flexible annular molding 20 is connected to the wheel cap body 10 by inserting the engaging leg 40 of the flexible annular molding 20 to the through-hole 10a of the wheel cap body 10 in a direction as shown by an arrow "a" in the figure. It should be noted that the figure shows only one of the engaging legs 40 and only one of the through-holes 10a into which the one engaging leg 40 is to be inserted.

As shown in the same figure, each engaging leg 40 comprises a proximal part 40a, a first engaging part 40b, a second engaging part 40c, and a distal end part 40d, which are integrated with each other, in a direction in which the engaging leg 40 extends or projects, from the side of the flexible molding body 30 in accordance with this order. The flexible annular molding 20 is made of a material, such as a synthetic resin, with high flexibility. In the figure, an axis showing the above direction in which the engaging leg 40 extends or projects, is designated by an imaginary line "A". For convenience, the axis "A" will be referred to as a "projecting axis" of the engaging leg 40, through the specification.

The first engaging part 40b comprises a first projecting part 41, while the second engaging part 40c has a second projecting part 42. These first and second projecting parts 41 and 42 project in different directions with respect to the projecting axis "A". In this embodiment, as shown in FIG. 1, the first projecting part 41 projects approximately in a radially inward direction of a tire, while the second projecting part 42 projects away from the tire approximately in a radially outward direction. The directions in which the first and second projecting parts 41 and 42 project, however, are not limited to these directions of this embodiment: what is required is that the projecting direction of the first projecting part 41 is different from the projecting direction of the second projecting part 42 with respect to the projecting axis. Therefore, for example, each engaging leg 40 may be so constructed that the first and second projecting parts are formed in a direction perpendicular to the radial direction of the tire with the projecting directions of the first and second projecting parts are opposite relative to the projecting axis.

The first projecting part 41 comprises a curving surface 41a, extending towards the second engaging part 40c, by which the first projecting part 41 is gradually reduced in its diameter towards the distal end part 40d. In the same manner, the second projecting part 42 comprises a curving surface 42a, by which the second projecting part 42 is gradually reduced in its diameter towards the distal end part 40d. These curving surfaces 41a and 42a make the insertion of the engaging leg 40 into the through-hole 10a of the wheel cap body 10 easier and smoother.

Meanwhile, an outer side of the through-hole 10a to which the engaging leg 40 of the flexible annular molding 20 is inserted, is formed as a tapering surface 11, corresponding to the curving surfaces 41a and 41b of the first and second projecting parts 41 and 42, whose inner diameter is reduced in size towards an inner side, opposite the outer side, of the wheel cap body 10.

With this construction, the curving surfaces 41a and 42a of the engaging leg 40 of the flexible annular molding 20 cooperate with the tapering surface 11 of the through-hole 10a of the wheel cap body 10, thus realizing even easier insertion of the engaging leg 40 into the through-hole 10 of the wheel cap body 10.

Furthermore, a surface 41b, opposing the inner surface 31 of the annular flexible molding body 30, of the first projecting part 41, and a surface 42b, opposing the inner surface 31 thereof, of the second projecting part 42, are made generally flat in shape, respectively.

On the other hand, the wheel cap body 10 has a pair of flat inner surfaces 41b' and 42b', adjacent to the through-hole 10a thereof, corresponding to the flat surfaces 41b and 42b, respectively.

Figure 6:
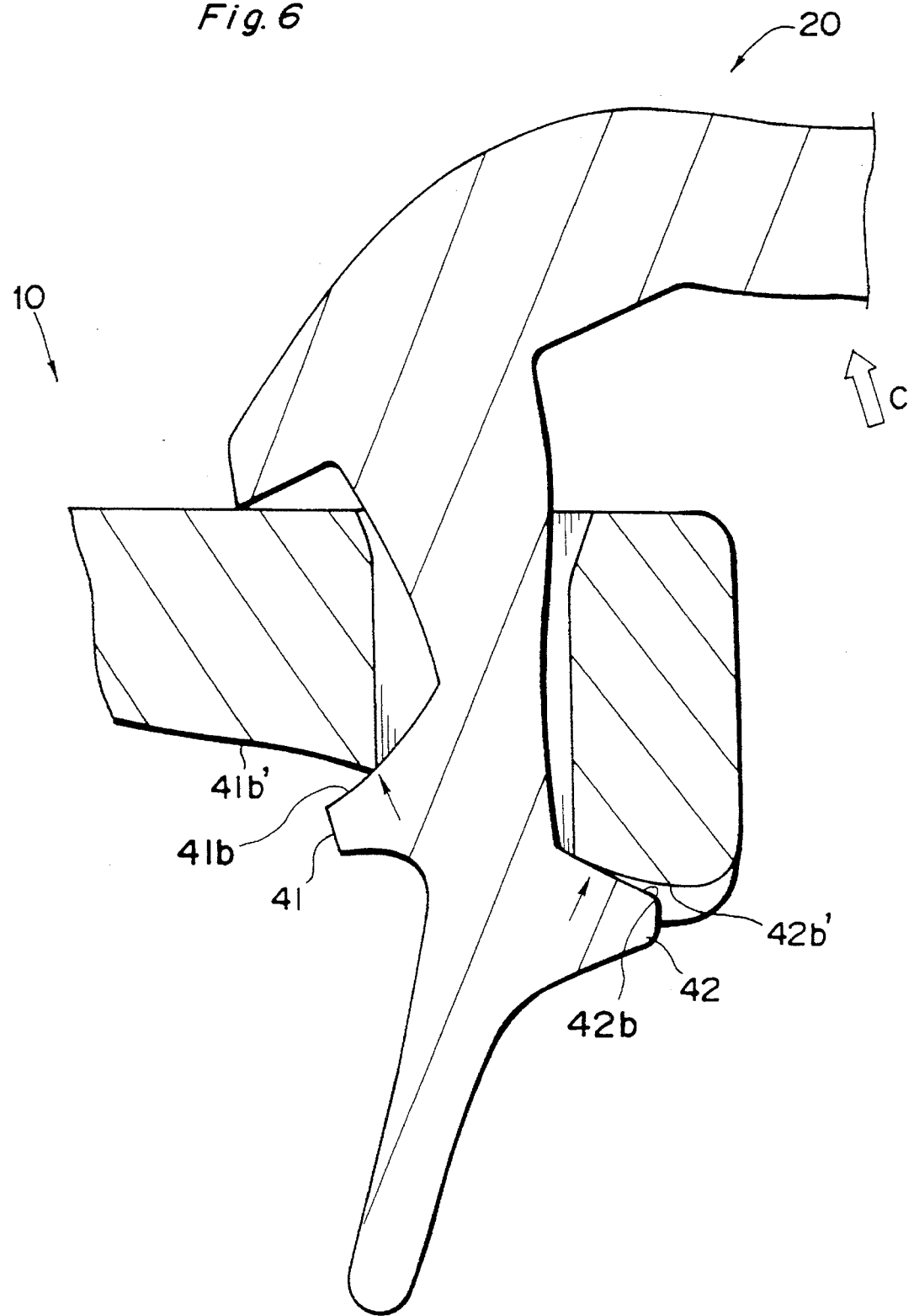
FIG. 6 is a partial, explanatory sectional view, of the wheel cap of FIG. 5, showing a situation in which an external force is exerted upon the flexible annular molding relative to the wheel cap body in such a direction that the flexible annular molding falls off the wheel cap body.

Thanks to these flat surfaces 41b and 42b of the first and second projecting parts 41 and 42, and the inner surfaces 41b' and 42b' of the wheel cap body 10, if any external force is exerted upon the flexible annular molding 20 in such a direction as disconnecting the engaging leg 40 of the flexible annular molding 20 from the wheel cap body 10 as shown in FIG. 6, the flat surface 41b of the first projecting part 41 is pressed against a part of the inner surface 41b' and/or the flat surface 42b of the second projecting part 42 is pressed against a part of the inner surface 42b' of the wheel cap body 10, to generate a resistant force to stand against the above external force so that the annular flexible molding body 30 is prevented from falling off the wheel cap body 10.

In this connection, the reason why the flat surface 42b of the second projecting part 42 is formed slanting towards the distal end portion 40, is to make it match a direction in which a metallic molding slider is pulled out when the flexible annular molding 20 is manufactured.

The first and second projecting parts 41 and 42 are so constructed that the amount of projection of the first projecting part 41 is approximately equal to the amount of projection of the second projecting part 42, and they are so constructed that the diameter or width, of the first and second engaging part 40b and 40c, perpendicular to the above projecting axis "A" is sufficiently much larger than the inner diameter or width of the through-hole 10a of the wheel cap body 10.

As shown in FIG. 1, the flexible annular molding 20 comprises a concave portion 50 between the flat surface 41b of the first projecting part 41 and the inner surface 31 of the annular flexible molding body 30; and a concave portion 60 between the flat surface 42b of the second projecting part 42 and the inner surface 31 of the annular flexible molding body 30. Also, as shown in the figure, the wheel cap body 10 is so constructed that the axial length L1 of a first wall surface 51 of the through-hole 10a corresponding to the first concave part 50 is generally equal to the axial length L2 between the flat surface 41b of the first projecting part 41 and the inner surface 31 of the annular flexible molding body 30 and that the axial length L3 of a second wall surface 61 of the through-hole 10a corresponding to the second concave part 60 is generally equal to the axial length L4 between the flat surface 42b of the second projecting part 42 and the inner surface 31 of the annular flexible molding body 30.

Figure 5:
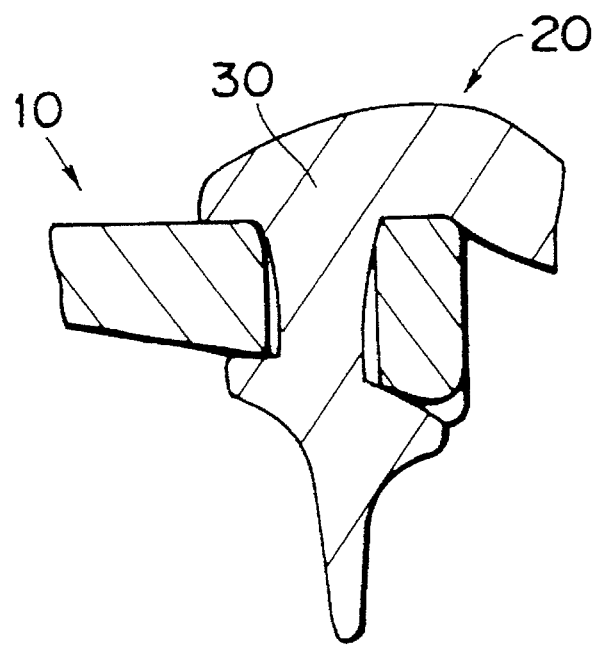
FIG. 5 is a view similar to FIG. 2, showing a situation in which the work to connect the flexible annular molding to the wheel cap body is completed.

Accordingly, when the flexible annular molding 20 is connected to the wheel cap body 10 as shown in FIG. 5, a first part including the above first wall surface 51 of the wheel cap body 10 engages with the first concave part 50 of the flexible annular molding 20 whereas a second part including the above second wall surface 61 of the wheel cap body 10 engages with the second concave part 60 of the flexible annular molding 20. That is, when the flexible annular molding 20 is connected to the wheel cap body 10, the first part of the wheel cap body 10 is held between the first projecting part 41 and the flexible annular molding body 30 while the second part of the wheel cap body 10 is held between the second projecting part 42 and the flexible annular molding body 30, thus the flexible annular molding 20 being surely locked or connected to the wheel cap body 10.

Next, referring to FIGS. 1 to 5, each step for connecting the flexible annular molding 20 to the wheel cap body 10, is described below in a sequential manner.

Figure 2:
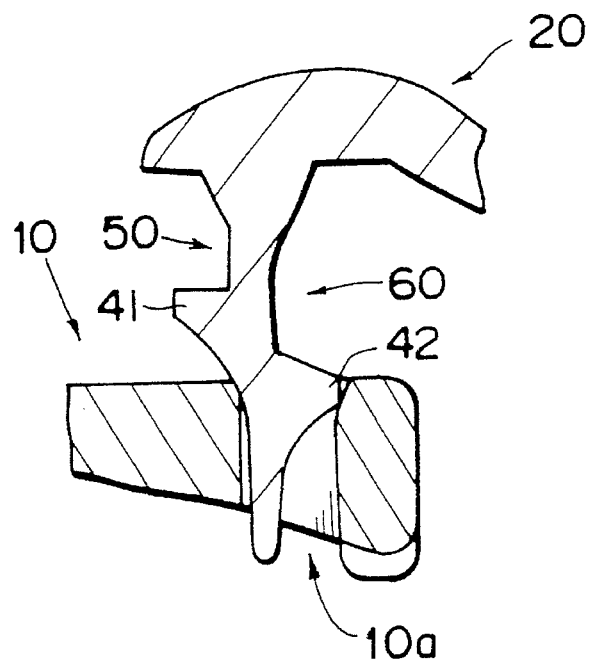
FIG. 2 is a partial, explanatory sectional view of the wheel cap of FIG. 1, showing a first step to connect the flexible annular molding to the wheel cap body.

First, the distal end part 40d of the flexible annular molding 20 is inserted to the through-hole 10a of the wheel cap body 10 in a direction as designated by the letter "a" in FIG. 1. As a result of this insertion, some part of the distal end part 40d of the engaging leg 40 comes out of the through-hole 10a of the wheel cap body 10 as shown in FIG. 2 which illustrates a situation that no external force is exerted upon the flexible annular molding 20.

Figure 3:
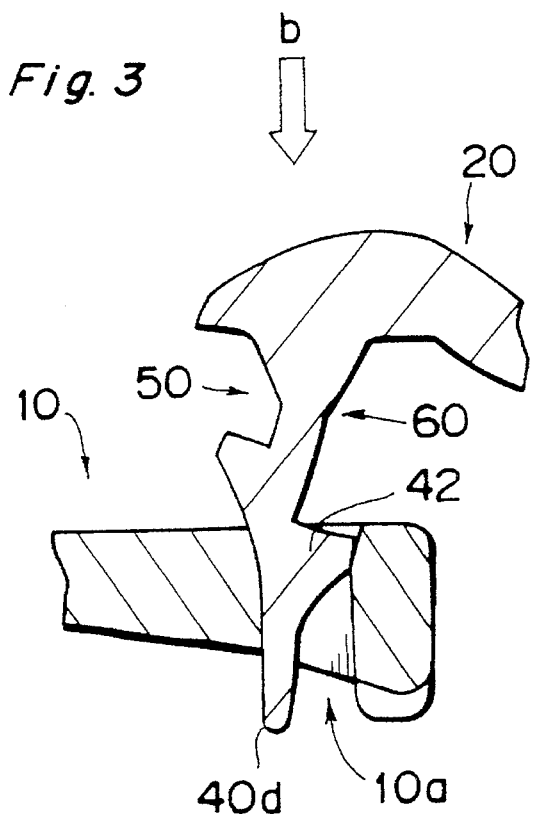
FIG. 3 is a view similar to FIG. 2, showing a second step thereof.

Then, by exerting an external force upon the flexible annular molding 20 in a direction as designated by a letter "b" in FIG. 3, the second projecting part 42 of the engaging leg 40 is slidingly inserted into the through-hole 10a of the wheel cap body 10 with the second projecting part 42 being flexibly deformed against the inner surface of the through-hole 10a thereof.

Figure 4:
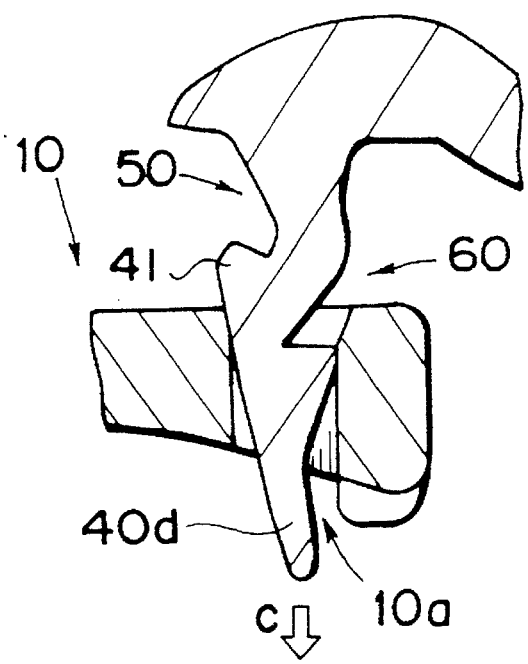
FIG. 4 is a view similar to FIG. 2, showing a third step thereof.

Then, as shown in FIG. 4, by pulling the distal end part 40d of the engaging leg 40 in such a direction as designated by a letter "c" therein relative to the inner surface of the wheel cap body 10, the first projecting part 41 of the engaging leg 40 is slidingly inserted into the through-hole 10a of the wheel cap body 10 with the first projecting part 41 being flexibly deformed against the inner surface of the through-hole 10a thereof.

Then, by further pulling the distal end part 40d of the engaging leg 40 in the same direction relative to the wheel cap body 10, both the first and second projections 41 and 42 are passed through the through-hole 10a of the wheel cap body 10, and the deformed shape of the engaging leg 40 is restored to its original shape. At this moment, the work to connect the flexible annular molding 20 to the wheel cap body 10 is completed, as shown in FIG. 5.

When the first and second projecting parts 41 and 42 of the engaging leg 40 are under way of being inserted into the through-hole 10a of the wheel cap boy 10, both the curving surface 41a of the first projecting part 41 of the engaging leg 40, and the curving surface 42a of the second projecting part 42 thereof help the first and second projecting parts 41 and 42 slide over the tapering surface 11 of the through-hole 10a of the wheel cap body 10, thus making it relatively easier to carry out the work to insert the engaging leg 40 of the flexible annular molding 20 into the through-hole 10a of the wheel cap body 10. In addition, each projecting part 41, 42 of the engaging leg 40 is flexed when it is passed through the through-hole 10a of the wheel cap body 10 as mentioned above, and the deformation of each projecting part 41, 42 is absorbed by the first concave part 50 corresponding to the first projecting part 41 and the second concave part 60 corresponding to the second projecting part 42, respectively, as best shown in FIG. 4, thus making the insertion of the engaging leg 40 into the through-hole 10a of the wheel cap body much easier.

Figure 10:
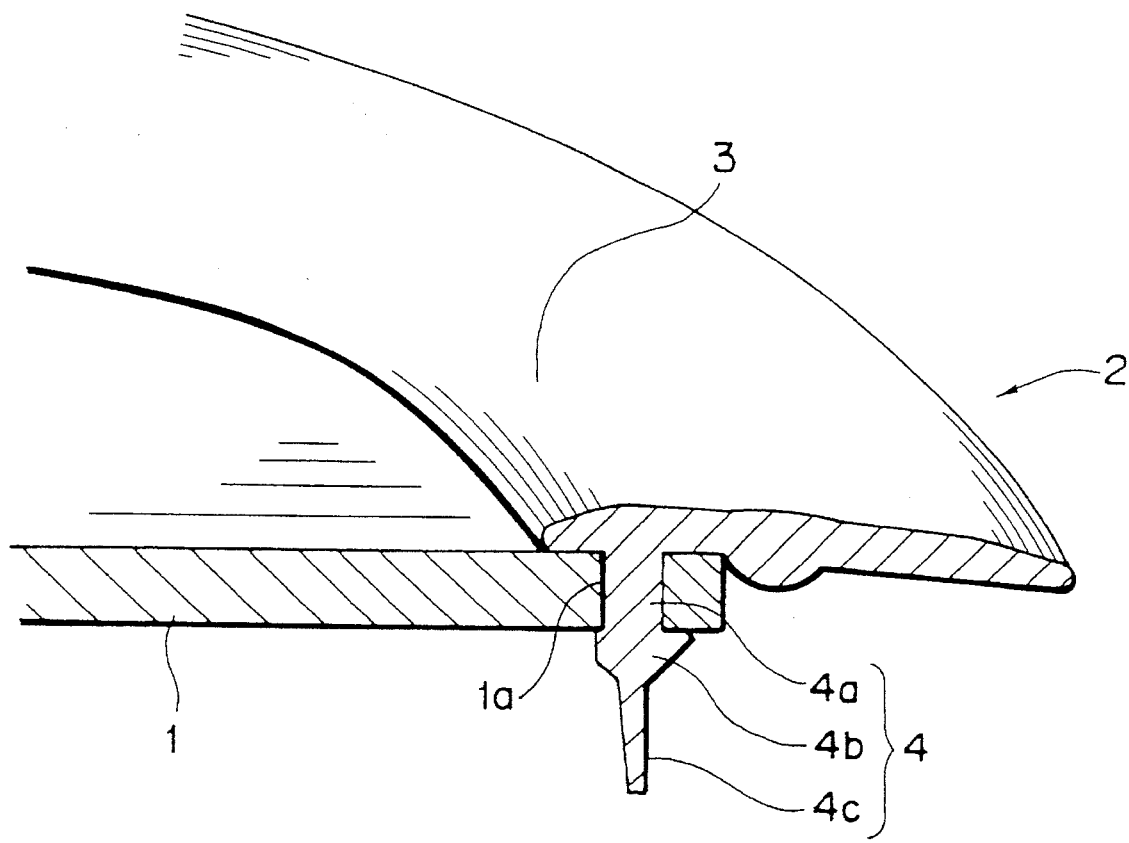
FIG. 10 is a perspective view, similar to FIG. 8, showing a wheel cap according to a second prior art.

In this connection, the external force exerted upon the engaging leg 40 with respect to the wheel cap body 10 in order to make the first and second projecting parts 41 and 42 pass through the through-hole 10a of the wheel cap body 10, is as small as the external force which is required to make the engaging leg 4 pass through the through-hole 1a of the wheel cap body 1 according to the second prior art (See FIG. 10).

As mentioned above, the wheel cap body 10 is so constructed that the axial length L1 of a first wall surface 51 of the through-hole 10a corresponding to the first concave part 50 is generally equal to the axial length L2 between the flat surface 41b of the first projecting part 41 and the inner surface 31 of the annular flexible molding body 30 and that the axial length L3 of a second wall surface 61 of the through-hole 10a corresponding to the second concave part 60 is generally equal to the axial length L4 between the flat surface 42b of the second projecting part 42 and the inner surface 31 of the annular flexible molding body 30. With this construction, when the flexible annular molding 20 is connected to the wheel cap body 10, the first and second projecting parts 41 and 42, respectively, cooperate with the flexible annular molding body 30 so that the flexible annular molding 20 is locked to the wheel cap body 10 with the wheel cap body 10 being held in position between the projecting parts 41, 42 and the flexible annular molding body 30, as shown in FIG. 5.

When the tire provided with the wheel cap body 10 and the flexible annular molding 20 connected to the wheel cap body 10, of the car rides over a curbstone, for example, during driving the car, the outer surface of the tire swells or bends outwardly over the curbstone, so that a force to make the flexible annular molding 20 drop off the wheel cap body 10 is exerted on the flexible annular molding 20 relative to the wheel cap body 10. However, at this time, as shown in FIG. 6, the flat surface 41b of the first projecting part 41 of the engaging leg 40 is pressed against some part of the flat surface 41b' of the inner surface of the wheel cap body 10, while the flat surface 42b of the second projecting part 42 thereof is pressed against some part of the flat surface 42b' of the inner surface of the wheel cap body 10, whose mutually pressing or contacting action prevents the flexible annular molding 20 from falling off the wheel cap body 20.

Figure 8:
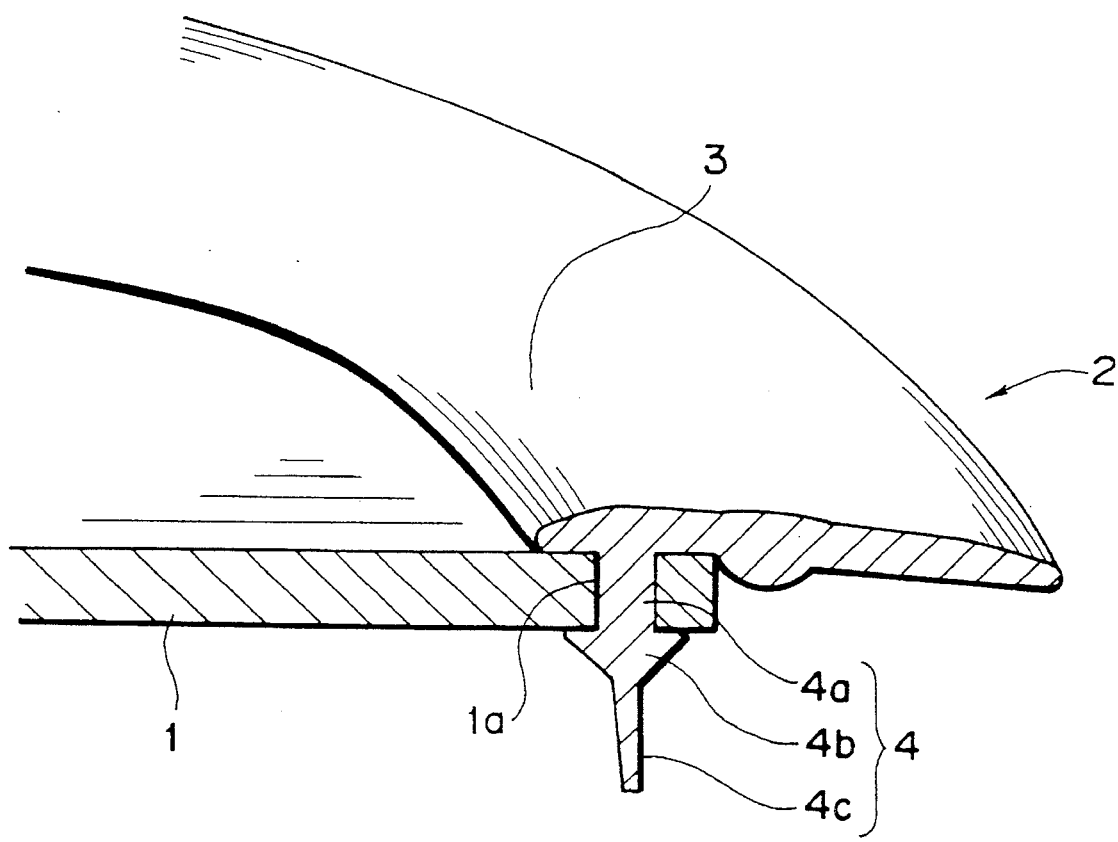
FIG. 8 is a partial, sectional view showing a wheel cap, from an oblique direction, according to a first prior art.
Figure 9:
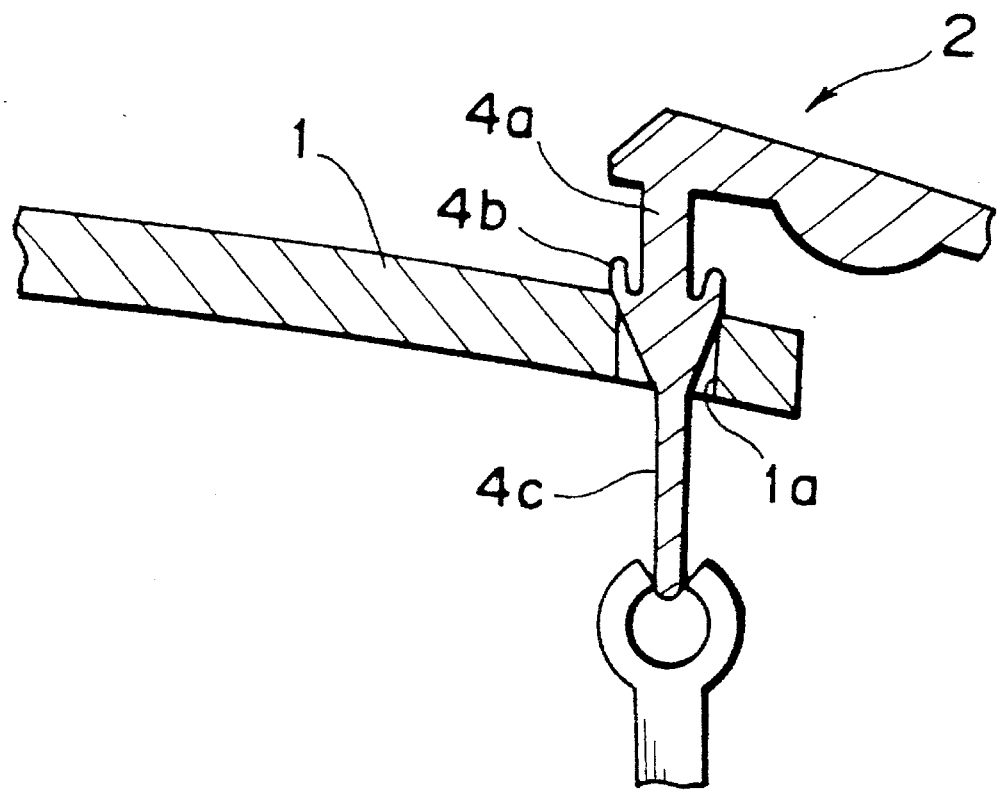
FIG. 9 is a partial, sectional view of the wheel cap of FIG. 8, showing explanatorily how to connect the flexible annular molding to the wheel cap body.

With this construction, the resistance to prevent the flexible annular molding 20 from falling off the wheel cap body 10 is as large as the corresponding resistance to prevent the flexible annular molding 3 from falling off the wheel cap body 1 according to the first prior art (See FIG. 8).

Second, referring to FIG. 7, a wheel cap according to a second embodiment thereof is described below.

Figure 7:
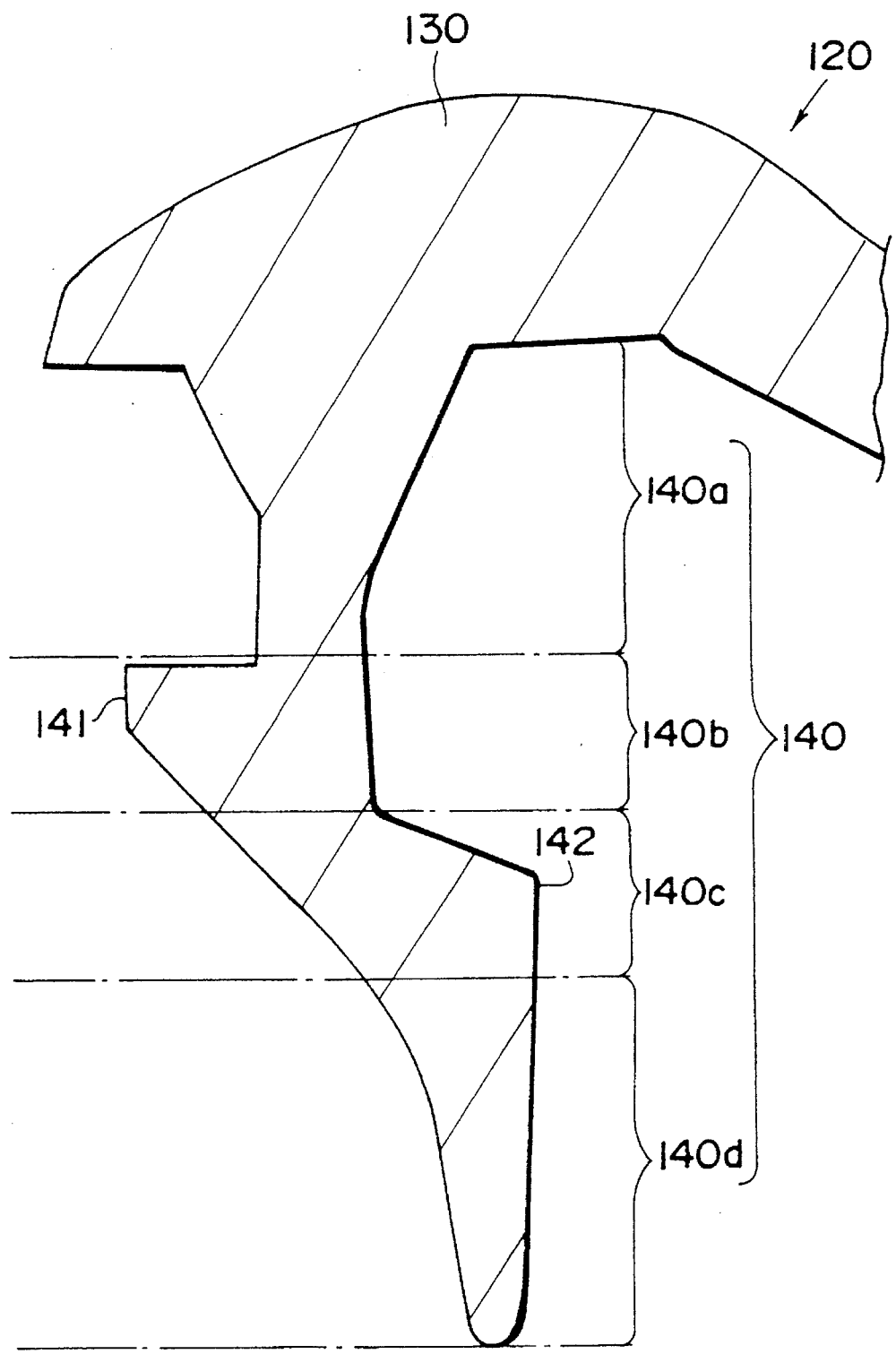
FIG. 7 is a partial, sectional view showing a flexible annular molding according to a second embodiment of the present invention.

FIG. 7 illustrates the wheel cap with a structure for connecting a flexible annular molding 120 to a wheel cap body similar to the wheel cap body according to the first embodiment. As shown in the figure, the flexible annular molding 120 has a basic construction similar to that of the flexible annular molding 20 of the first embodiment, except that a tip part of the engaging leg 140 of the second embodiment is different in shape from the second engaging part 40c and the distal end part 40d of the engaging leg 40 of the first embodiment. That is, a distal end part 140d, corresponding to the distal end part 40d of the first embodiment, of the engaging leg 140 is integrated with a second engaging part 140c, corresponding to the second engaging part 40c of the first embodiment, so that both a shoulder of the second projecting part 142, and the distal end part 140d on the same side as that of the shoulder thereof extend generally as a flat surface in an axial direction in which the engaging leg 140 extends, if the flexible annular molding 120 is viewed as a cross section as shown in the figure. With this construction, when the distal end part 140d of the engaging leg 140 is pulled out of the through-hole of the wheel cap body, the engaging leg 140 is deformed flexibly more linearly than the engaging leg 40 according to the first embodiment is done; therefore, only a smaller, external force is required to make the engaging leg 140 of the flexible annular molding 140 pass through the through-hole of the wheel cap body. Also, once the flexible annular molding 20 is attached to the wheel cap body, the resistance against any external force to make the flexible annular molding 20 drop off the wheel cap body is as large as the resistance which is realized by the wheel cap of the first embodiment of the present invention as shown in FIG. 1.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wheel cap for an automobile comprising:

a wheel cap body which is formed approximately in a disk shape and which has a periphery thereof in which a plurality of through-holes are made with adjacent through-holes separating from each other with a pre-determined space, and a flexible annular molding which is fitted around the periphery of the wheel cap body and which has a molding body and a plurality of engaging legs, corresponding to the through-holes, which extend from the molding body in a projecting direction in which each of the engaging leg is inserted into the through-hole of the wheel cap body, each engaging leg of the flexible annular molding having a proximal part, a first engaging part, a second engaging part, and a distal part, which are fixed one after another in this order from a side of the molding body, wherein the proximal part, which has an outer diameter generally equal to an inner diameter of the through-hole of the wheel cap body, engages the through-hole of the wheel cap body, wherein the first and second engaging parts have an outer diameter larger than the inner diameter of the through-hole, respectively, wherein the distal part has an outer diameter generally equal to or smaller than the inner diameter of the through-hole, the first engaging part having a first projecting part while the second engaging part having a second projecting part, wherein each of the first and second projecting parts extends in a direction perpendicular to the projecting direction of the engaging leg and extends in a direction different from each other with respect to the projecting direction, so that the first projecting part is provided at a location different from a location in which the second projecting part is provided with respect to a distance from the molding body, so that the flexible annular molding has a first concave part between the molding body and the first projecting part while the flexible annular molding has a second concave part between the molding body and the second projecting part, a length in the projecting direction of the through-hole which corresponds to the first concave part corresponding to a length in the projecting direction of the first concave part while a length in the projecting direction of the through-hole which corresponds to the second concave part corresponding to a length in the projecting direction of the second concave part.

2. The wheel cap for the automobile as claimed in claim 1, in which the first engaging part has a first curving surface on a side of the distal part of the engaging leg while the second engaging part has a second curving surface on the side thereof, both surfaces mutually tapering into the distal part of the engaging leg.

3. The wheel cap for the automobile as claimed in claim 1, in which a part of the through-hole on an outer side of the wheel cap body is defined by a tapering surface, the tapering surface being so formed that an inner diameter of the tapering surface is reduced from the outer side to an inner side thereof.

4. The wheel cap for the automobile as claimed in claim 1, in which the first and second projecting parts have a surface generally flat on a side of the molding body, respectively.

5. The wheel cap for the automobile as claimed in claim 1, in which both the first and second projecting parts extend in a radial direction of the wheel cap body.

6. The wheel cap for the automobile as claimed in claim 1, in which the second engaging part and the distal part are so made that the distal part on a side of the second projecting part of the engaging leg is formed generally level with a shoulder of the second projecting part thereof with respect to the projecting direction of the engaging leg.

7. The wheel cap for the automobile as claimed in claim 6, in which the first engaging part has a curving surface on a side of the distal part of the engaging leg, both the curving surface and the distal part on the side of the second projecting part of the engaging leg mutually tapering into the distal part of the engaging leg.

8. The wheel cap for the automobile as claimed in claim 6, in which a part of the through-hole on an outer side of the wheel cap body is defined by a tapering surface, the tapering surface being so formed that an inner diameter of the tapering surface is reduced from the outer side to an inner side thereof.

9. The wheel cap for the automobile as claimed in claim 6, in which the first and second projecting parts have a surface generally flat on a side of the molding body, respectively.

10. The wheel cap for the automobile as claimed in claim 6, in which both the first and second projecting parts extend in a radial direction of the wheel cap body.

* * * * *